United States Patent
Higgins

[11] Patent Number: 6,132,176
[45] Date of Patent: Oct. 17, 2000

[54] FLOW CONTROL SENSOR AND METHOD FOR FILLING OF A FILTER PRESS

[75] Inventor: David M. Higgins, Holland, Mich.

[73] Assignee: United States Filter Corporation, Palm Desert, Calif.

[21] Appl. No.: 09/228,012

[22] Filed: Jan. 8, 1999

[51] Int. Cl.[7] .................................................. F04B 49/00
[52] U.S. Cl. .............................. 417/46; 417/63; 417/53; 137/538
[58] Field of Search ............................ 417/46, 313, 63, 417/53; 137/554, 538

[56] References Cited

U.S. PATENT DOCUMENTS

| | | | |
|---|---|---|---|
| 3,943,969 | 3/1976 | Rubin et al. | 137/538 |
| 4,118,778 | 10/1978 | Strub | 364/502 |
| 4,181,615 | 1/1980 | Wilms | 210/230 |
| 5,002,090 | 3/1991 | Ichikawa et al. | 137/550 |
| 5,144,977 | 9/1992 | Eggerton et al. | 137/554 |
| 5,275,740 | 1/1994 | Spyker et al. | 210/741 |

OTHER PUBLICATIONS

"Pump Dynamics", pp. 2 and 3.
"Specialty Diaphragm Pumps", p. 20.
"M8 Metal Pump", p. 15 and "M4 Metal Pump", p. 14.
Product Information JWI® Bulletin, "New Improved! JWI° APCS" ©JWI® 1995, Holland, Michigan, U.S.A. 5/95/200 (one page).
ARO brochure, Diaphragm Pump cycle Sensor Kit, Feb. 1998 (one page).
ARO Operating Manual, Nov. 26, 1997 (4 pages).
Omega Technology Company, "Flow and Level Handbook", 1990, pp. B–57 and B–58.

*Primary Examiner*—Charles G. Freay
*Assistant Examiner*—Timothy P Solak
*Attorney, Agent, or Firm*—Flynn, Thiel, Boutell & Tanis, P.C.

[57] ABSTRACT

An air flow sensor and method for filling a filter press which detects slowing and/or intermittent stoppage of the feed pump and signals a controller associated with a pressure regulator to increase the pressure of the air supplied to the feed pump. The air flow sensor includes a spring-biased piston slidably movable within a housing, which piston defines a flow passage therein and carries a magnet thereon. A switching device is mounted on the housing and detects the position of the piston magnet, and when the piston approaches the closed position, the switching device transmits a signal to step-up the air pressure to the feed pump.

22 Claims, 7 Drawing Sheets

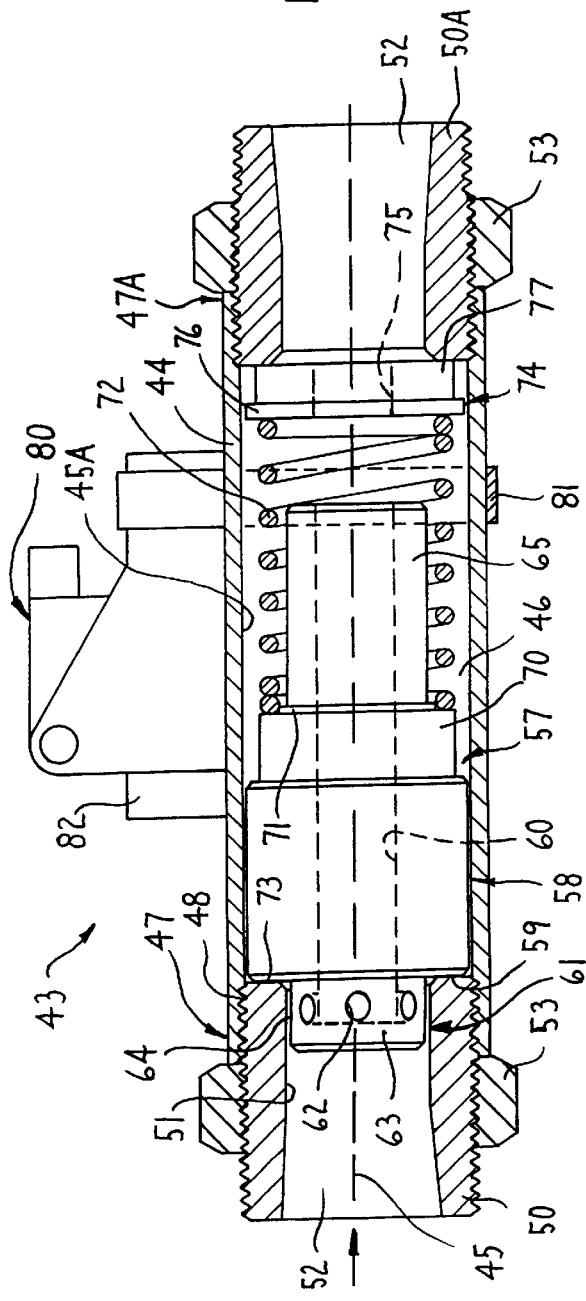
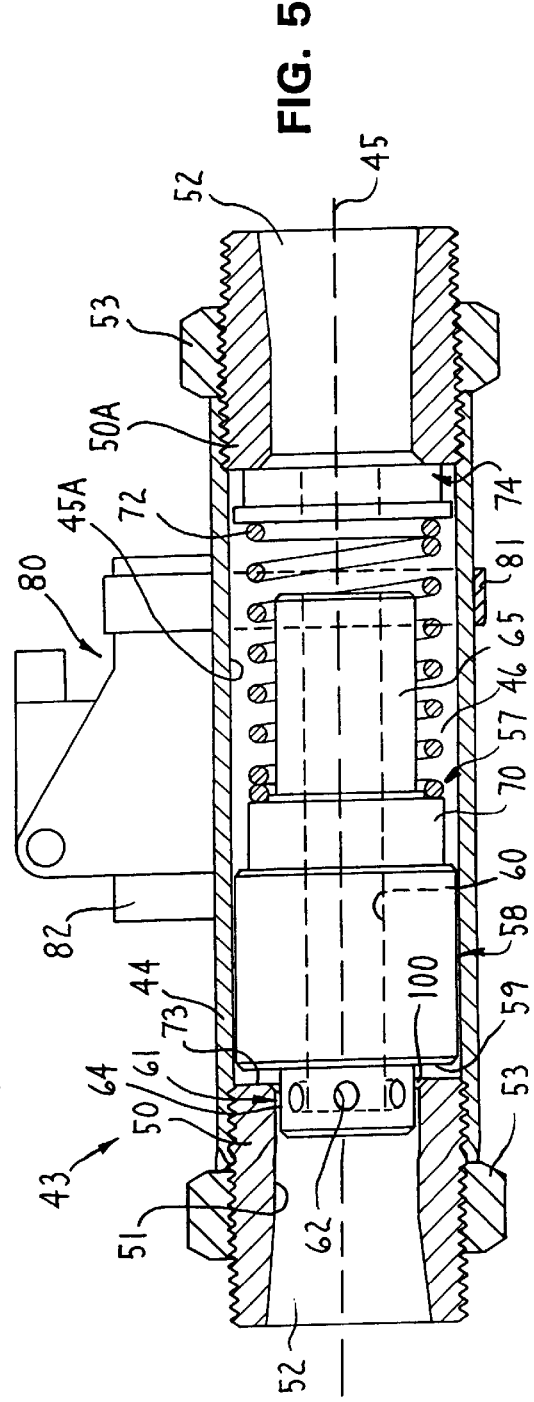
FIG. 4
FIG. 5

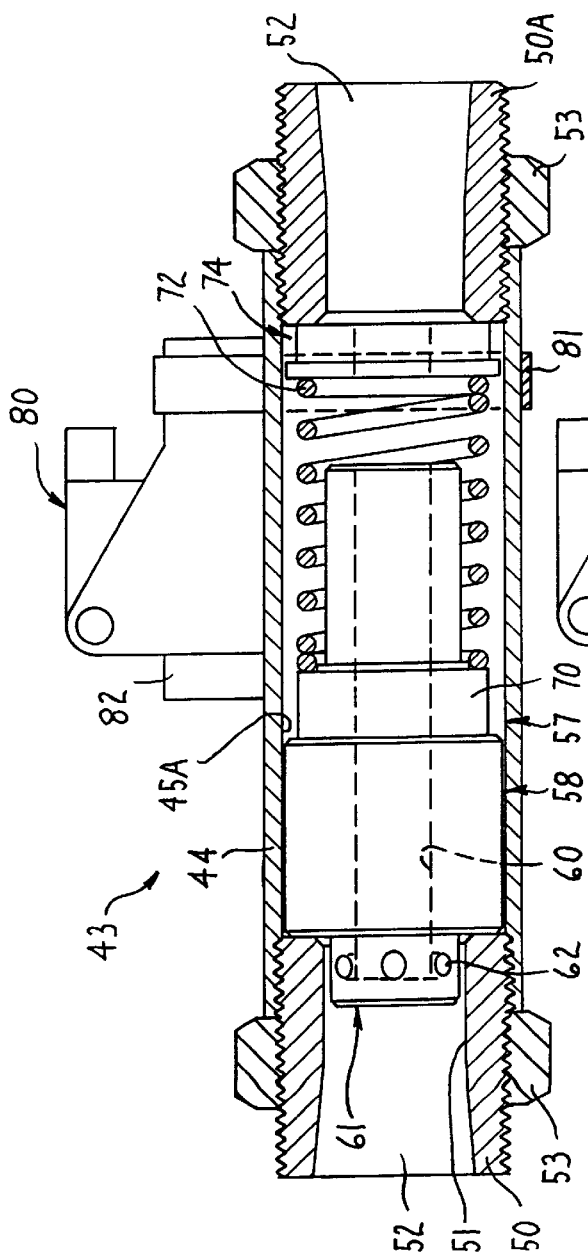
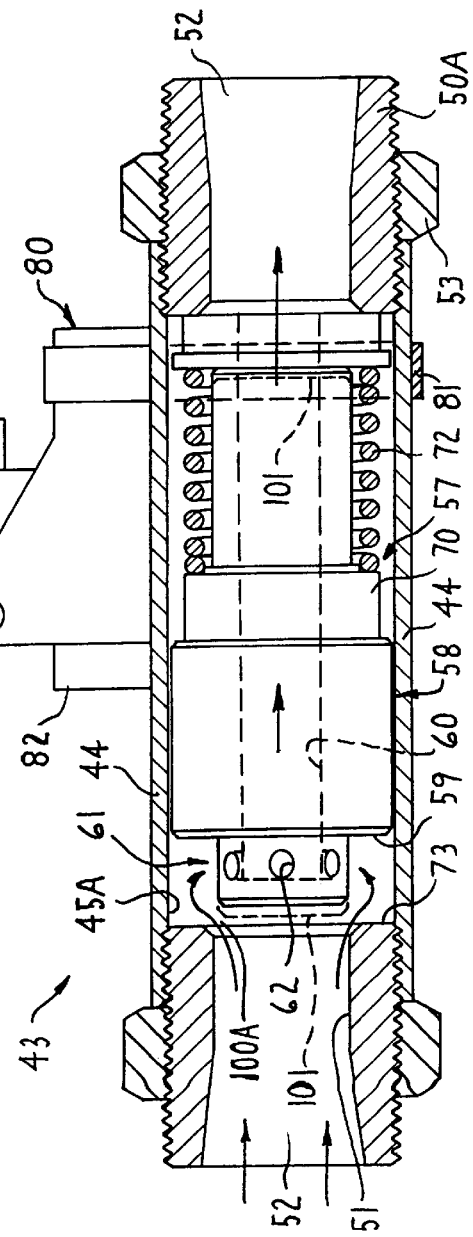

FLOW CONTROL SENSOR AND METHOD FOR FILLING OF A FILTER PRESS

FIELD OF THE INVENTION

This invention relates to an improved device and method for filling a filter press with slurry and, more particularly, to a device and method in which slowing and/or intermittent stoppage of a feed pump is sensed by an air flow sensor mounted in the air pressure supply line to the feed pump, or alternatively in the exhaust line associated with the feed pump.

BACKGROUND OF THE INVENTION

During filling of the chambers defined between filter plates of a filter press, sensing when the feed pump slows down or stops so as to initiate a pressure step-up in the air supplied to the feed pump has presented a significant problem. Although a position or motion sensor mounted directly on the feed pump would solve this problem, many users prefer to utilize different types of feed pumps, and the many different types of available feed pumps prevent the adoption of any standardized sensing arrangement mountable directly on the feed pump. Thus, there is a need to be able to sense the slow down or intermittent stoppage of the feed pump without having to rely on a sensor which mounts directly on the pump. In addition, there is a need for a sensor capable of detecting the slow down of the feed pump and which may be utilized with both small and large capacity feed pumps.

In an effort to solve the above-described problem, flow sensors of the paddle wheel type and of the type including a movable ball in a tapered column have been employed and are typically mounted in the air supply line leading to the feed pump. However, these devices have been found to be unreliable, and in this regard, breakage of the paddle wheel type device has been encountered.

In addition, an in-line flow sensor has been employed which includes an outer tube having a slightly tapered inner diameter, and a spring-urged piston slidably disposed therein. However, with this arrangement, the large stroke of the piston presents problems with regard to the anticipated mode of operation.

It is therefore an object of the present invention to provide an improved device and method for filling a filter press which overcomes many of the disadvantages associated with prior arrangements.

More specifically, one aspect of the invention relates to a filter press including a horizontally elongate frame, and first and second head assemblies mounted at opposite ends of the frame, wherein the first head assembly is disposed adjacent one end of the frame and supported for horizontal movement toward and away from the second head assembly so as to be respectively movable into closed and opened positions, and the second head assembly is stationarily positioned adjacent the other end of the frame. A plurality of filter plates are supported on the frame for movement therealong between the first and second head assemblies, the filter plates being pushed together into a horizontally extending closed stack and clampingly held between the first and second head assemblies when the first head assembly is moved toward the second head assembly into the closed position. A diaphragm-type feed pump is typically provided for supplying slurry material under pressure to the plurality of chambers defined between the filter plates. The feed pump is connected to a source of air by an air supply line, and is exhausted with an exhaust line in communication with the atmosphere. A pressure regulator is associated with the air supply line for maintaining the air supplied to the feed pump at a predetermined pressure. The press also includes an air flow sensor adapted to detect a decrease in air flow volume therethrough upon slowing of the feed pump during a press filling cycle and to transmit a signal to a controller associated with the pressure regulator to increase the pressure of the air supplied to the feed pump.

Another aspect of the invention relates to a flow control sensor including a housing having an inner wall defining an interior chamber, and a piston slidably disposed within the chamber and defining a flow passage therein. The piston is movable between an open position for permitting air flow through the flow passage and a closed position for closing off the flow passage, and has a magnet mounted thereon for movement therewith. The sensor additionally includes a switching device mounted on the housing and adapted to detect an axial position of the magnet as the piston approaches the closed position upon slowing of the feed pump during a press filling cycle, and to transmit a signal to increase the pressure of the air supplied to the feed pump. The switching device is also adjustable to accommodate air flow through the sensor proportional to the capacity of the feed pump.

Still another aspect of the invention relates to a method for filling a filter press having a feed pump for supplying slurry material under pressure to a plurality of chambers defined by filter plates, a pressure regulator associated with an air supply line connected to the feed pump, and a controller for operating the pressure regulator. The method includes: (1) providing an air flow sensor in the air supply line between the feed pump and the pressure regulator, the air flow sensor having a piston including a flow passage therethrough and being movable between open and closed positions; (2) adjusting the air flow sensor to sense a closing movement of the piston and thus a decrease in air flow volume through the air flow sensor proportional to the feed pump capacity; (3) supplying pressurized air to the feed pump through the air flow sensor by moving the piston thereof into the open position and feeding slurry into the filter press; (4) performing step (3) until the slurry pressure in the filter press approaches the supply pressure and causes the piston of the air flow sensor to move from the open position toward the closed position; (5) sensing the position of the piston as same approaches the closed position, and before the piston fully closes transmitting a signal to the controller to increase the supply pressure to the feed pump; and (6) repeating steps (3) through (5) at the increased supply pressure until a predetermined maximum supply pressure is reached.

Yet another aspect of the invention relates to a method for filling a filter press having a feed pump for supplying slurry material under pressure to a plurality of filter plates, a pressure regulator associated with an air supply line connected to the feed pump, a controller for operating the pressure regulator, and an exhaust line connected to the feed pump. The method includes: (1) providing an air flow sensor in the exhaust line, the air flow sensor having a piston including a flow passage therethrough, the piston being movable between open and closed positions and being normally biased into the closed position; (2) adjusting the air flow sensor to sense a closing movement of the piston and thus a decrease in air flow volume through the air flow sensor proportional to the feed pump capacity; (3) supplying pressurized air to the feed pump through the air supply line and feeding slurry into the filter press; (4) supplying a pressurized air pulse generated by the feed pump to the exhaust line to move the piston of the air flow sensor into the open position, and thereafter returning said piston to said closed position; (5) repeating steps (3) and (4) until the piston remains in the closed position for a period of time greater than a predetermined time period and thereafter transmitting a signal to the controller to increase the supply pressure to the feed pump.

Other objects and purposes of the invention will be apparent to persons familiar with devices of this general type upon reading the following specification and inspecting the accompanying drawings.

BRIEF DESCRIPTION OF THE DRAWINGS

FIG. 4 is a partial cross-sectional view of the air flow sensor according to the invention which illustrates the piston thereof in a fully closed position, and which illustrates the switch in a position for use with a low capacity feed pump;

FIG. 5 is a partial cross-sectional view similar to FIG. 4, but illustrating the piston in a partially closed position;

FIG. 7 is a partial-cross sectional view of the air flow sensor similar to FIG. 4 with the piston thereof in a fully closed position, but which illustrates the switching device of the air flow sensor in a position for use with a high capacity feed pump; and FIG. 8 is a partial cross-sectional view similar to FIG. 7, but illustrating the piston in an open position.

Figure 1:
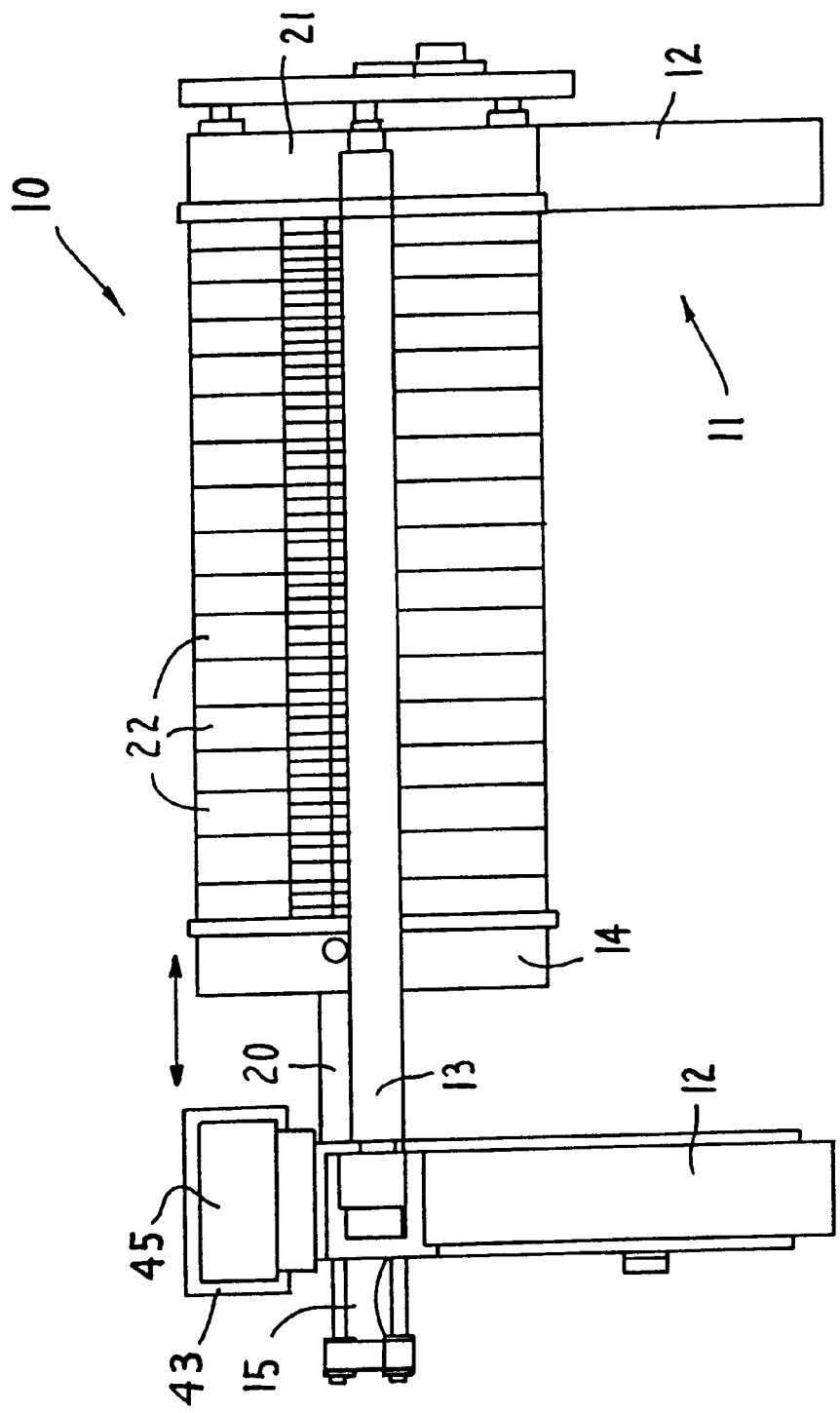
FIG. 1 is a side elevational view of a filter press according to the invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the press and designated parts thereof. Said terminology will include the words specifically mentioned, derivatives thereof, and words of similar import.

DETAILED DESCRIPTION

Figure 2:
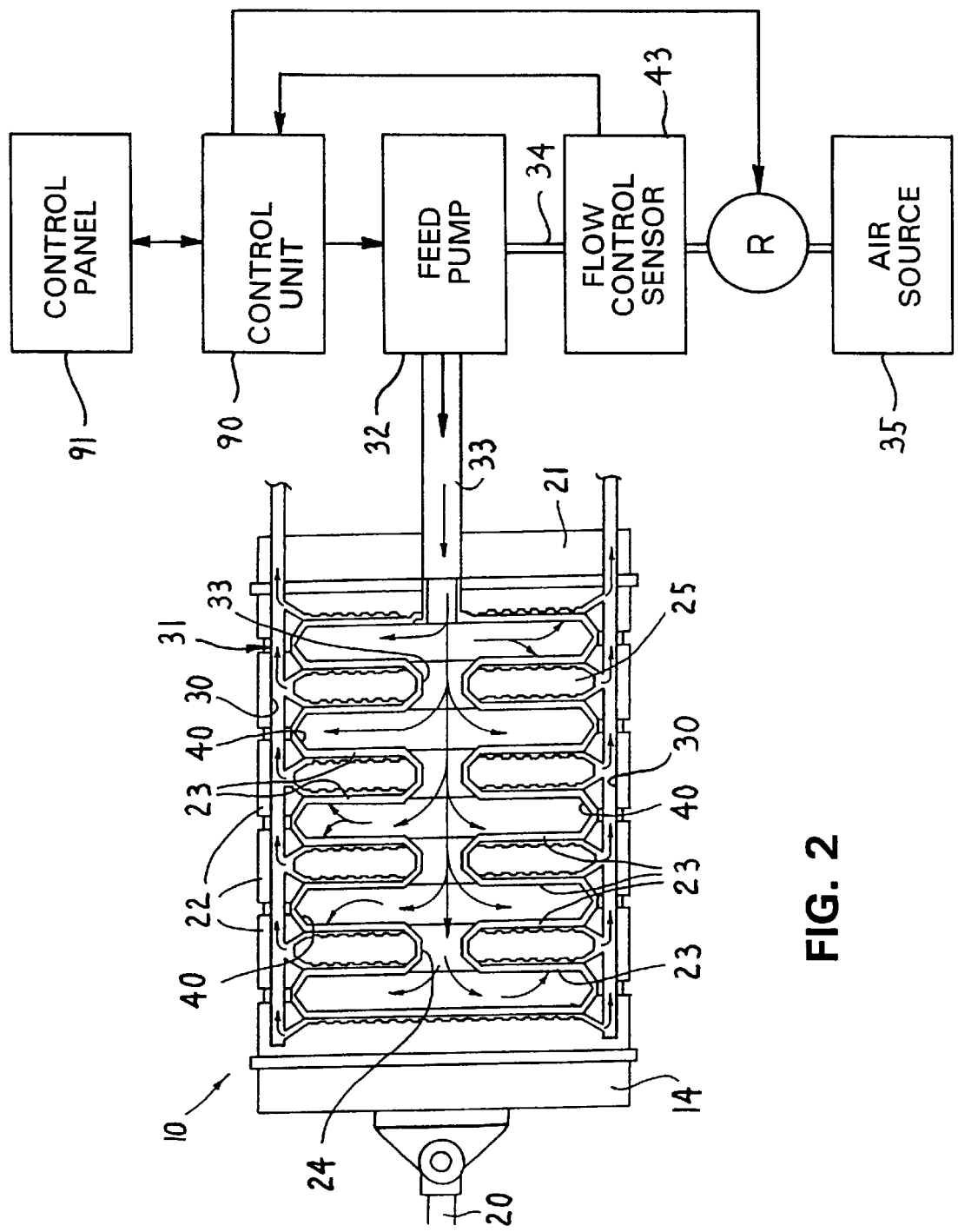
FIG. 2 is a diagrammatic view which illustrates the manner in which the invention filters slurry material and senses the operating condition of the feed pump.

FIGS. 1 and 2 illustrate a filter press 10 embodying the present invention. The filter press 10 includes a frame 11 having a pair of upright supports 12 and a pair of generally parallel, horizontal slide rails 13 supported on the supports 12 and extending generally horizontally therebetween.

A movable head or follower 14 is supported for sliding movement longitudinally along the slide rails 13. A fluid pressure cylinder 15 is mounted on one of the supports 12, and a cylinder rod 20 is extendible from and retractable into the pressure cylinder 15. Further, the cylinder rod 20 extends generally parallel to the slide rails 13 and has one end connected to the movable head 14, whereby the pressure cylinder 15 effects reciprocal sliding movement of the movable head 14 along the slide rails 13. A stationary head 21 is fixedly mounted on the other support 12, and a plurality of filter plates 22 are interposed between the movable head 14 and the stationary head 21. The filter plates 22 are supported on the slide rails 13 and are freely reciprocally slidable thereon between the upright supports 12.

In the illustrated embodiment, each of the filter plates 22 has a pair of parallel enlarged faces, each of which is provided with a filter cloth 23 (FIG. 2). The filter cloths 23 lie in substantially vertical planes which are generally perpendicular to the slide rails 13. A central opening 24 extends completely through each of the filter plates 22 at the center of the filter cloths 23.

When the pressure cylinder 15 is actuated so as to slide the movable head 14 rightwardly in FIG. 1, the filter plates 22 are pressed together between the heads 14 and 21 in snugly adjacent, sealed relationship relative to one another. The sealed relationship between adjacent filter plates 22 may be effected by, for example, a suitable O-ring or gasket as is well known in the art.

Each filter plate 22 is a generally hollow, rectangular body having an interior space or chamber 25 defined therein and separated from the exterior thereof by the filter cloths 23. The filter plates 22 are provided with return passages 30 which communicate with the chambers 25 of the filter plates 22 for permitting clear filtrate to be returned therefrom. As shown in FIG. 2, when the filter plates 22 are disposed in adjacent sealed relationship, the return passages 30 define return conduits 31 which carry clear filtrate out of the filter press 10.

Figure 2A:
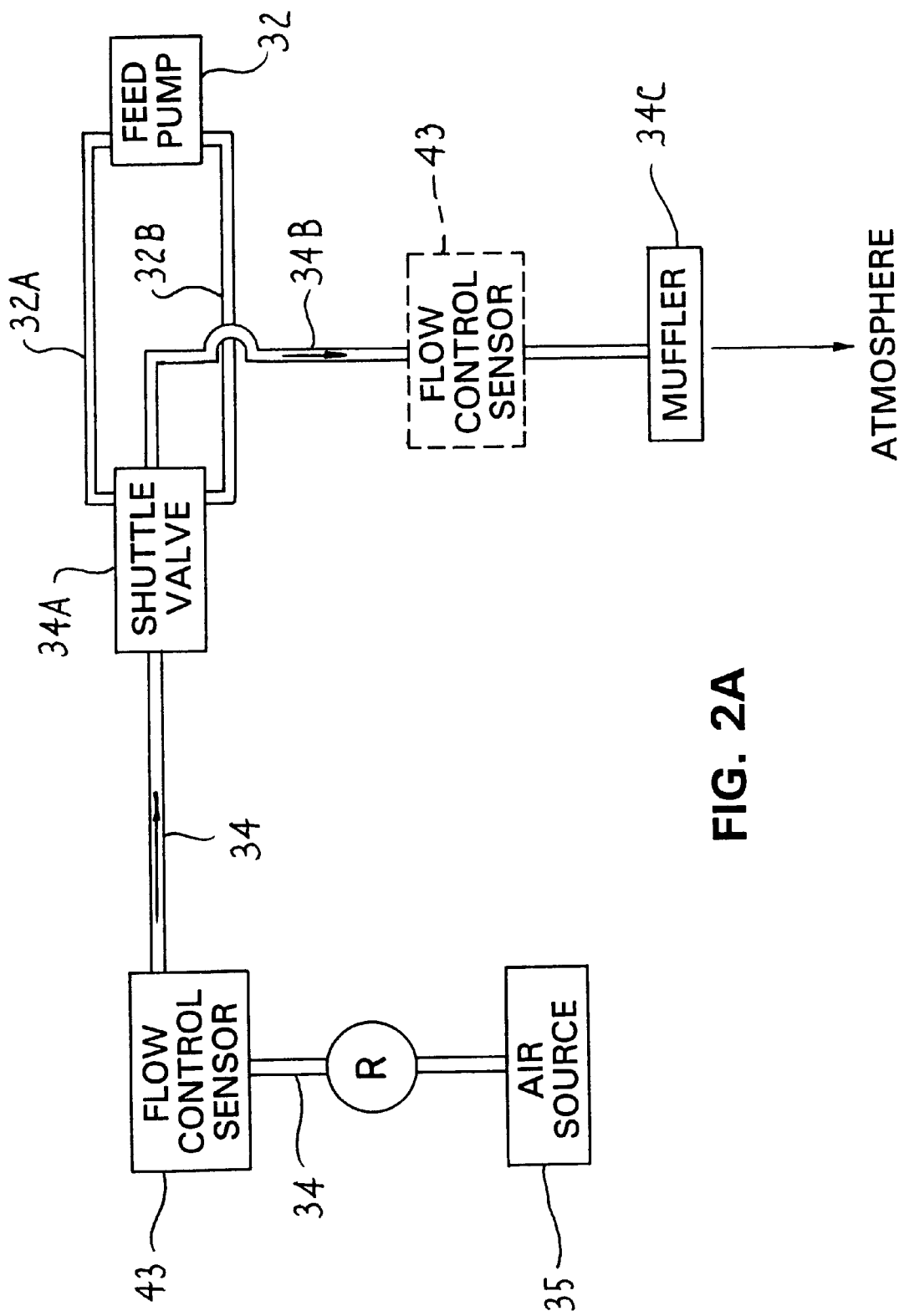
FIG. 2A is a diagrammatic view similar to FIG. 2 which illustrates the operation of the feed pump in greater detail.

Pressurized slurry material is supplied to the filter press 10 from a feed pump 32 via a supply inlet 33. The feed pump 32 is preferably a conventional double-diaphragm air-activated pump connected by an air supply line 34 to a source of pressurized air 35, such as a central pressurized air supply. As shown in FIG. 2A, a conventional shuttle valve 34A is associated with feed pump 32, and serves to control the flow of pressurized air from line 34 to two pump chambers (not shown) through lines 32A and 32B. In this regard, when valve 34A is in a first position, a diaphragm in a first of the two pump chambers is pressurized to feed liquid to the filter press 10 (i.e. the diaphragm performs a fluid discharge stroke), while the air in a second of the pump chambers is exhausted through a pump exhaust line 34B (i.e. the diaphragm in the second chamber performs an air exhaust stroke). Oppositely, when valve 34A is in a second position, the diaphragm in the second pump chamber is pressurized to feed liquid into the filter press 10, while the first pump chamber exhausts through exhaust line 34B. One complete pump cycle occurs after each diaphragm has gone through one air exhaust or one fluid discharge stroke.

The above process results in pressure pulses of air in exhaust line 34B due to the sequential discharge of air from the two pump chambers as caused by movement of the shuttle valve 34A between the first and second positions. One example of such a diaphragm pump 32 is the commercially available Wilden double-diaphragm pump. In addition, a conventional muffler 34C is preferably provided in the pump exhaust line 34B, which muffler 34C vents the exhaust into the atmosphere as shown by the arrow in FIG. 2A.

The slurry supply inlet 33 communicates through the stationary head 21 with the aligned central openings 24 of the filter plates 22. Slurry chambers 40 are defined between opposing filter cloths 23 of adjacent pairs of filter plates 22. The slurry material passes from the supply inlet 33 through the aligned central openings 24 and into the slurry chambers 40 as illustrated by the arrows in FIG. 2. When the slurry is sufficiently pressurized, particulate accumulates on the filter cloths 23 while clear filtrate passes through the filter cloths 23 into the chambers 25 of the respective filter plates 22 and ultimately into the return conduits 31. The particulate accumulates in the slurry chambers 40, forming filter cakes (not shown). The filter plates 22 are thereafter slidably separated, and the filter cakes are removed.

The description of the structure and operation of the filter press described above is well known, and further detailed description of the press is believed unnecessary. The following description will hence be directed to the air flow sensor according to the invention.

Figure 6:
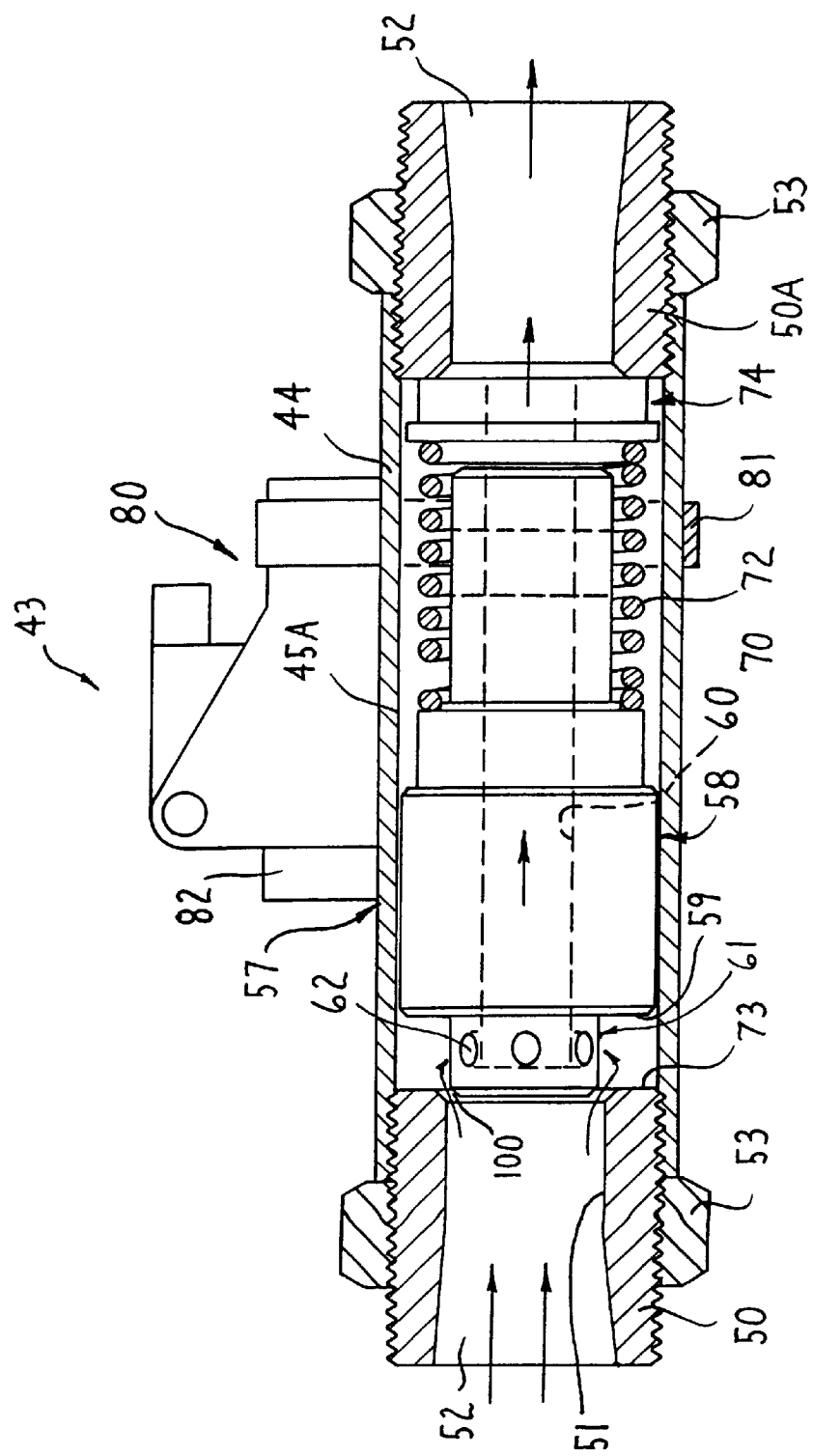
FIG. 6 is a partial cross-sectional view similar to FIG. 4, but illustrating the piston in an open position.

With reference to FIGS. 4–6, the air flow sensor 43 according to the invention preferably includes an elongate tubular housing 44 defining a central longitudinal axis 45. Housing 44 includes an inner generally cylindrical wall 45A which defines an axially extending chamber 46. The housing 44 terminates at respective upstream and downstream ends 47 and 47A, each of which ends is internally threaded as indicated at 48. Air flow sensor 43 additionally includes a pair of externally threaded and generally cylindrical, open-ended upstream and downstream end fittings 50 and 50A, each of which includes an inner wall 51 which defines an axially extending flow passage 52. Inner wall 51 is preferably generally cylindrical adjacent the inner end of the respective end fitting 50, 50A, and gradually tapers outwardly relative to axis 45 at the outer end of fitting 50, 50A. End fittings 50 and 50A are preferably threadingly engaged within the respective upstream and downstream ends 47 and 47A of housing 44 and are axially secured relative to housing 44 by a securing member such as a conventional nut 53.

The air flow sensor 43 also includes a reciprocating piston 57 having a piston body 58 slidingly disposed within chamber 46 of housing 44. Piston 57 defines therein an axially extending and generally centrally oriented flow passage 60 as shown in dotted lines in FIGS. 4–6, and includes a generally cylindrical upstream end or nose 61 which projects axially from the upstream end of piston body 58. Piston body 58 has a substantially greater diameter than nose 61 so that a shoulder 59 is defined at the upstream end of piston body 58. Shoulder 59 preferably acts as a stop as discussed below. Nose 61 defines therein a plurality of radially oriented ports 62, which ports 62 at inner ends thereof communicate with flow passage 60 and open at an outer cylindrical surface 63 of nose 61. The outer surface 63 of nose 61 is preferably sized to permit free sliding engagement of nose 61 within the cylindrical portion of inner wall 51 of upstream end fitting 50 so that ports 62 may be opened and closed as discussed below. The opposed cylindrical walls 51 and 63 define a narrow annular clearance passage 64 therebetween, as also explained below.

The downstream end of piston 57 is embodied by an elongate stop portion 65, about which stop portion 65 a ring-like magnet 70 is disposed and fixed thereto closely adjacent the downstream end of piston body 58. In the illustrated embodiment, magnet 70 is preferably fixed to stop portion 65 by a retaining ring 71, and may be additionally or alternatively secured to stop portion 65 by adhesive.

A coil spring 72 is provided within housing chamber 46 to bias piston 57 in a closed position (FIG. 4) whereby nose 61 is located completely within upstream end fitting 50 so that the ports 62 are blocked by the inner wall 51 thereof, and shoulder 59 of piston body 58 abuts a corresponding end surface or stop 73 of upstream end fitting 50. Spring 72 is disposed between magnet 70 and a stop member 74 associated with downstream end fitting 50A. Stop member 74 preferably defines therein an axial flow passage 75, and is preferably held in place against the upstream end of end fitting 50A by spring 72. In this regard, stop member 74 may also be adhesively secured to the upstream end surface of end fitting 50A. In the illustrated embodiment, stop member 74 includes a flat washer 76 which contacts one end of spring 72, and a gasket 77 which contacts the upstream end surface of end fitting 50A. Further, the washer 76 and gasket 77 are preferably adhesively secured to one another.

The air flow sensor 43 also includes a switching device 80 exteriorly mounted on the housing 44 by means of a mounting ring 81 which surrounds housing 44. Switching device 80 is preferably a proximity or reed switch and includes a magnetic sensor 82 which cooperates with magnet 70. The switching device 80 is preferably movably adjustable longitudinally along housing 44 to adjust the switching position thereof, for example by means of an adjustment screw (not shown).

Referring back to FIG. 2, a control unit 90 including a conventional microprocessor is provided, which control unit 90 is operable through a control panel 91 provided on or adjacent the filter press 10. Alternatively, the control unit 90 may include conventional relay switches. Control unit 90 preferably controls a pressure regulator R associated with the air supply line 34. The air flow sensor 43, in accordance with one embodiment, is mounted by means of conventional push-lock adapters (not shown) which attach to end fittings 50 and 50A in the air supply line 34 between the pressure regulator R and the feed pump 32.

In operation, upon start-up, the air pressure is set to an initial value by control unit 90, so that the regulator R supplies air at about 25 psi through the air flow sensor 43 to the feed pump 32. This air pressure applies force to the nose 61 of piston 57 causing the piston 57 to move from a fully closed or start-up position (FIG. 4) to an open position (FIG. 6) against the biasing force of spring 72 so that pressurized air flows through the upstream end fitting 50, into ports 62 of piston nose 61, into flow passage 60 and through downstream end fitting 50A to the feed pump 32. The pressurized air flowing through an annular flow control passage 100 defined between the free end of nose 61 and the cylindrical wall 51, as shown in FIG. 6, experiences a pressure drop due to the enlarged cross-sectional area downstream thereof, and hence the pressure downstream of the piston 57 as supplied to the feed pump 32 is less than the upstream pressure, which serves to hold the piston 57 open.

As the filter press 10 fills with slurry, a back pressure develops in the press 10 which is transmitted through the feed pump 32 and ultimately onto the downstream end of the piston 57. The back pressure downstream of the piston 57 gradually approaches the upstream air pressure, and when the downstream air pressure and the biasing force of spring 72 approach and begin to exceed the upstream air pressure, the piston 57 initiates a closing movement towards upstream end fitting 50. As the piston 57 approaches a closed position, but before reaching a fully closed position (i.e., when piston 57 is in a partially closed position as shown in FIG. 5), the magnetic sensor 82 of switching device 80 senses the magnet 70 on piston 57 and transmits a signal to the control unit 90 which activates a timer (not shown). If the piston 57 does not reopen within a predetermined time, the timer times out and transmits a signal to the pressure regulator R to adjust same so that the pressure in the air supply line 34 is increased to the next level, for example 50 psi. This increased pressure causes piston 57 to move into the open position once again (FIG. 6), and the cycle begins anew until the back pressure again closely approaches the supply pressure. The above-described cycle is repeated until the supply pressure reaches a predetermined maximum level, at which time the press 10 is full and the slurry supply is stopped. The filter plates 22 are then slidably separated and the filter cakes are removed in a conventional manner.

Figure 3:
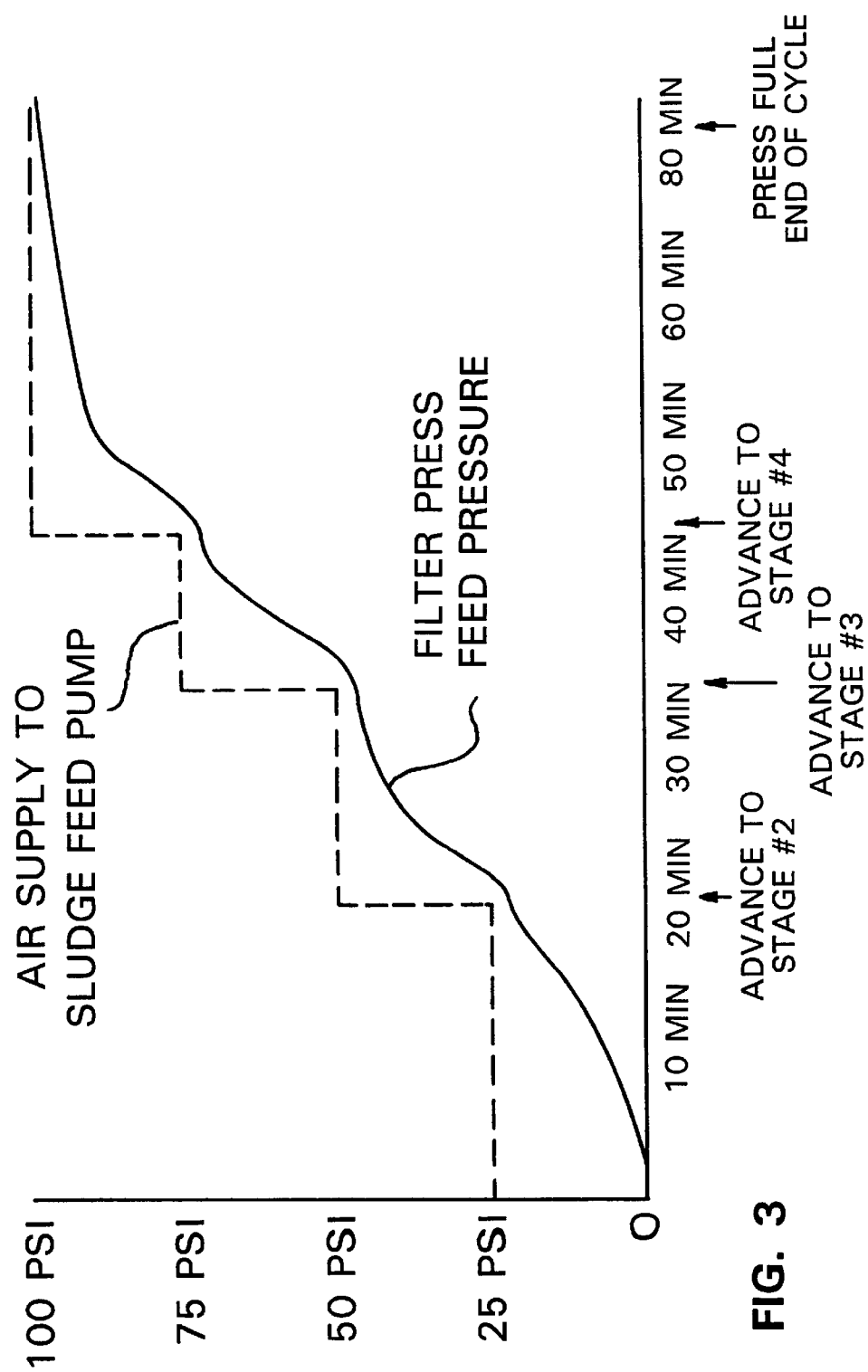
FIG. 3 is a graph which illustrates pump pressure and slurry pressure during a filtration (i.e. press filling) cycle according to the invention.

With reference to FIG. 3, same illustrates the air supply pressure to the feed pump 32 (shown by a dotted line) and feed pressure (shown by a solid line) during a press filling cycle in accordance with the invention. At each step of the overall filling process, when the back pressure approaches the supply pressure, the feed pump 32 is slowing down and approaching a stopped condition, and it is this condition which is being sensed by the air flow sensor 43 so that the air pressure can be stepped up. FIG. 3 illustrates that the supply pressure is increased in intervals of 25 psi throughout a press filling cycle. It will be appreciated that other pressure intervals may be utilized in accordance with the invention, and the press filling cycle shown in FIG. 3 is presented only as an example.

The air flow sensor 43 according to the invention is usable with both low and high capacity feed pumps 32, for example, feed pumps which range from approximately one inch to three inch (i.e. inside pipe diameter for the slurry). High capacity feed pumps require a widely different quantity of air flow in order to operate properly. For example, the leakage through a three inch feed pump when stopped may be as much as about 30 cfm, whereas in contrast the maximum flow rate through a one inch feed pump when operating may only be about 15 cfm to about 20 cfm. In order to respond to this condition, the sensitivity of air flow sensor 43 is adjustable in response to flow volume which is proportional to the capacity of the particular feed pump being used. More specifically, the position of the switching device 80 is axially adjustable relative to housing 44 so as to sense different positions of the piston magnet 70 depending upon the air flow being sensed (i.e. depending upon the pump capacity).

For example, FIGS. 4–6 illustrate the air flow sensor 43 in use with a low capacity feed pump (for example a one inch pump) whereby the switching device 80 and thus magnetic sensor 82 are positioned close to the fully closed position of the piston 57 since the flow control sensor 43 must permit a relatively small flow rate therethrough, and must sense a decrease in air flow volume when the flow rate is very small, for example about 3 cfm. In contrast, FIGS. 7 and 8 illustrate the air flow sensor 43 in use with a high capacity feed pump (for example a three inch pump), whereby the switching device 80 is positioned further away from the closed position of the piston 57, since the feed pump when stopped permits a higher flow or leakage rate through sensor 43, and hence this higher flow rate is sensed only when the switching device 80 is spaced a greater distance from the fully closed position of the piston 57.

Referring back to FIG. 6 which illustrates the air flow sensor 43 in use with a low capacity feed pump, the piston 57 is caused to move into the open position by the application of air pressure to piston nose 61, which air pressure holds the piston 57 in this open position. Due to the relatively small flow rate through the air flow sensor 43 as permitted by the low capacity feed pump, the flow control passage 100 defined around piston nose 61 in the open position of the piston 57 is narrow. As the piston 57 is moved toward the closed position due to back pressure as discussed above, the piston nose 61 moves into the cylindrical portion of flow passage 52 defined by wall 51 of end fitting 50 (FIG. 5) which operates to restrict or decrease the transverse cross-sectional area of flow control passage 100, and thus the air flow volume through air flow sensor 43 is decreased. The magnetic sensor 82 of switching device 80 senses this movement of the piston magnet 70 and transmits a signal to the control unit 90. In other words, when the piston 57 is in the open position of FIG. 6, the air flow volume through sensor 43 is determined by the size of flow control passage 100. As the piston 57 approaches the closed position as shown in FIG. 5, the air flow volume within sensor 43 decreases, since the air must now flow through the narrow annular clearance passage 64 defined between the outer surface 63 of piston nose 61 and the wall 51 of end fitting 50. Thus, the air flow volume within sensor 43 decreases as the piston 57 moves further into the passage 52 of end fitting 50 (i.e. as the annular clearance passage 64 becomes longer).

With reference to FIG. 8 which illustrates the air flow sensor 43 in use with a high capacity feed pump, the piston 57 is moved into the open position (shown in solid lines) by the application of air pressure to piston nose 61 and is held in a retracted position against the stop member 74 (i.e. the elongate stop portion 65 of piston 57 abuts the stop member 74) due to the large flow rate through the air flow sensor 43 as permitted by the high capacity feed pump. In this open position, the annular flow passage 100A defined around piston nose 61 has a much larger cross-sectional area than passage 100 shown in FIG. 6. As the piston 57 is moved toward the closed position due to back pressure, the piston nose 61 moves into a partially closed or sensing position 101 (shown in dotted lines in FIG. 8). The piston nose 61 in this position serves to restrict the transverse cross sectional area of passage 100A and causes a decrease in flow volume through the air flow sensor 43. The magnetic sensor 82 senses this movement of the piston magnet 70 and signals the control unit 90 as discussed above. In contrast to the operation of the sensor 43 in use with a low capacity feed pump as discussed above, the air flow volume through sensor 43 is determined by the size of flow control passage 100A, since the movement of the piston 57 towards the closed position is detected by the magnetic sensor 82 prior to insertion of piston nose 61 into passage 52 of end fitting 50.

It will be appreciated that when the piston 57 is in the fully closed or start up position as shown in FIGS. 4 and 7, the flow resistance through the air flow sensor 43 is large since the clearance passage 64 defined between outer surface 63 of piston nose 61 and wall 51 of end fitting 50 is long (i.e. as measured in the axial direction), and thus the air flow volume through the sensor 43 is negligible.

The flow control sensor 43 according to the invention would typically be coupled to either a ½ inch air supply line or a ¾ inch air supply line, depending upon the capacity of the feed pump 32. For example, a one inch feed pump would typically require a ½ inch air supply line, and a three inch feed pump would typically require a ¾ inch air supply line. In this regard, the air flow sensor 43 is usable with a one to three inch feed pump, whereby adapter couplings (not shown) appropriate for the size of the air supply line are provided to mount the flow control sensor 43 therein.

As shown in FIG. 2A, the air flow sensor 43 according to the invention may alternatively be provided in the pump exhaust line 34B (as shown in dotted lines), preferably upstream of the muffler 34C. With the air flow sensor 43 mounted in the exhaust line 34B, the pulses of air in exhaust line 34B due to the sequential exhaust of the feed pump chambers as discussed above, preferably cause the piston 57 of sensor 43 to move into an open position or at least a partially open position, and the force of spring 72 returns the piston 57 into a closed, or at least partially closed position. In this regard, in contrast to the embodiment of the invention wherein the sensor 43 is mounted in the air supply line 34, the back pressure developed in the press 10 during filling thereof is not a factor, and the piston 57 moves toward the closed position due to the force of spring 72 only. Thus, the piston 57 executes a shuttling movement towards the open position and then towards the closed position each time the feed pump performs a complete cycle.

Each time the piston 57 approaches the closed position, the magnetic sensor 82 of switching device 80 senses the magnet 70 on piston 57 and transmits a signal to control unit 90 which activates the timer. If the piston 57 does not reopen within the predetermined time period, for example as the feed pump 32 slow downs and the time between air pulses in exhaust line 34B becomes greater, the timer times out and transmits a signal to the pressure regulator R to increase the pressure in air supply line 34 to the next level, as discussed above. The air flow sensor 43 when mounted in the exhaust line 34B follows the supply pressure more closely since back pressure developed in the press 10 is not a factor as with the prior embodiment.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A filter press comprising:
    a horizontally elongate frame;
    first and second head assemblies mounted at opposite ends of said frame, said first head assembly being disposed adjacent one end of said frame and supported for horizontal movement toward and away from said second head assembly so as to be respectively movable into closed and opened positions;
    a plurality of filter plates supported on said frame for movement therealong between said first and second head assemblies, said filter plates being pushed together into a horizontally extending closed stack and clampingly held between said first and second head assemblies when said first head assembly is moved toward said second head assembly into said closed position;
    a feed pump for supplying slurry material under pressure to said plurality of filter plates, said feed pump being connected to a source of air by an air supply line;
    a pressure regulator associated with said air supply line for maintaining the air supplied to said feed pump at a predetermined pressure; and
    an air flow sensor mounted in said air supply line between said feed pump and said pressure regulator, said air flow sensor having an upstream end and a downstream end and including a housing defining a chamber therein, and a piston slidably disposed within said chamber and movable between a first position which permits air flow from said air supply line through said sensor in response to upstream air pressure and a second position which restricts air flow through said sensor in response to downstream air pressure generated during a press filling cycle which is indicative of slowing of said feed pump, said sensor being adapted to transmit a signal to a controller associated with said pressure regulator upon said piston moving into said second position to increase the pressure of the air supplied to said feed pump.

2. The filter press of claim 1 wherein said housing is generally tubular and defines a longitudinal axis, and said piston defines a centrally disposed and axially extending flow passage therein for permitting air flow through said piston in said first position thereof.

3. The filter press of claim 2 wherein said piston includes an enlarged piston body configured for sliding engagement with said housing and a nose portion projecting axially from said piston body and defining therein a plurality of radially oriented ports in communication with said flow passage.

4. The filter press of claim 3 wherein said sensor includes a generally tubular end fitting attached to an upstream end of said housing, said end fitting having an inner wall defining an orifice in communication with said air supply line, said nose portion being configured for sliding movement within said orifice and along said inner wall such that in said second position of said piston said nose portion is disposed at least partially within said orifice to restrict air flow through said ports, and whereby when pressurized air is supplied to said orifice said piston is moved into said first position and said nose portion retracts from said orifice to allow pressurized air to flow into said ports and thereafter into said flow passage of said piston.

5. The filter press of claim 4 wherein said end fitting and said nose portion together define an annular flow passage about said nose portion in said first position of said piston, and as said piston approaches said second position, the cross sectional area of said annular flow passage is reduced such that air flow volume through said sensor is decreased.

6. The filter press of claim 4 wherein said piston body is disposed downstream of said nose portion and said nose portion defines a terminal upstream end of said piston, said flow passage opening axially at a terminal downstream end of said piston and terminating at said upstream end thereof within said nose portion and opening through said ports, said flow passage extending axially between said ports and said terminal downstream end of said piston in a continuous and uninterrupted manner.

7. The filter press of claim 1 wherein said housing defines a longitudinal axis, said piston defining an axially extending flow passage therein for permitting air flow therethrough from the air source in said first position of said piston, said sensor further including a magnet disposed on said piston for movement therewith and a switching device adapted for detecting an axial position of said magnet upon said piston moving into said second position.

8. The filter press of claim 7 wherein said switching device is mounted exteriorly of said sensor and is adjustable axially along said housing relative to said second position of said piston to accommodate an air flow volume therethrough proportional to the capacity of said feed pump.

9. The filter press of claim 2 wherein said sensor includes first and second stop members disposed adjacent opposite ends of said housing which are engageable with correspondingly disposed first and second stop portions of said piston to limit the stroke thereof, and a spring disposed adjacent said first said stop portion of said piston for biasing said piston towards said second position.

10. An air flow sensor for mounting in one of an air supply line for supplying air to a feed pump of a filter press and an exhaust line associated with the feed pump, said sensor comprising:
    an elongate and generally tubular housing defining a longitudinal axis and having an inner wall defining an interior chamber extending generally along the axis;
    a piston slidably disposed within said chamber and defining an axially extending bore therein, said piston being axially movable within said chamber between an open position for permitting air flow through said bore and a closed position for substantially closing off said bore to air flow, said piston having a magnet mounted thereon for movement therewith; and a switching device mounted on said housing for detecting an axial position of said magnet as said piston approaches said closed position upon slowing of a feed pump during a press filling cycle, said switching device transmitting a signal to a controller to increase the pressure of the air supplied to the feed pump and being adjustable to accommodate air flow through said sensor proportional to the capacity of said feed pump.

11. The sensor of claim 10 wherein said housing has an upstream end and a downstream end, said upstream end having a tubular configuration defining a generally axially extending orifice, said piston including an enlarged piston body configured for sliding engagement along said inner wall of said housing and a nose portion having a reduced diameter and projecting axially from said piston body, said nose portion being slidably movable within said orifice and defining therein a plurality of radially oriented ports which open inwardly at said bore for communication therewith and which open outwardly at an outer peripheral surface of said nose portion for communication with said orifice in said open position of said piston.

12. The sensor of claim 11 wherein said nose portion is configured for sliding movement within said orifice such that in said closed position of said piston said nose portion is disposed at least partially within said orifice to substantially close off said ports, and whereby when pressurized air is supplied to said orifice said nose portion retracts from said orifice to allow pressurized air to flow into said ports and into said bore of said piston.

13. The sensor of claim 12 wherein said outer peripheral surface of said nose portion is cylindrical, said outer peripheral surface of said nose portion and an inner annular wall of said tubular upstream end of said housing together define an annular flow passage disposed about said nose portion in said open position of said piston, and as said piston approaches said closed position, the cross sectional area of said annular flow passage is reduced such that air flow volume through said sensor is decreased.

14. The sensor of claim 12 wherein said nose portion has a closed terminal end disposed upstream of said ports and said bore terminates within said nose portion downstream of said closed terminal end and opens radially through said ports.

15. The sensor of claim 11 wherein said sensor includes first and second stop members respectively disposed at said upstream and downstream ends of said housing which are engageable with correspondingly disposed first and second stop portions of said piston to limit the stroke thereof between said open and closed positions, and a spring disposed adjacent said second stop portion of said piston for biasing said piston towards said closed position.

16. The sensor of claim 15 wherein said piston body has a diameter larger than a diameter of said nose portion such that a shoulder is formed on said piston which defines said first stop portion thereof, said second stop portion of said piston projecting axially from a side of said piston body opposite said nose portion, and said spring being disposed about said second stop portion and between said magnet and said second stop member.

17. The sensor of claim 10 wherein said switching device is adjustable axially along said housing relative to said closed position of said piston to accommodate feed pumps of different capacities.

18. A method for filling a filter press having a feed pump for supplying slurry material under pressure to a plurality of filter plates, a pressure regulator associated with an air supply line connected to the feed pump, and a controller for operating the pressure regulator, said method comprising:

(1) providing an air flow sensor in the air supply line between the feed pump and the pressure regulator, the air flow sensor having a piston including a flow passage therethrough and being movable between open and closed positions;

(2) adjusting the air flow sensor to sense a closing movement of the piston and thus a decrease in air flow volume through the air flow sensor proportional to the feed pump capacity;

(3) supplying pressurized air to the feed pump through the air flow sensor by moving the piston thereof into the open position and feeding slurry into the filter press;

(4) performing said step (3) until the slurry pressure in the filter press approaches the supply pressure and causes the piston of the air flow sensor to move from the open position toward the closed position;

(5) sensing the position of the piston as same approaches the closed position, and before the piston fully closes transmitting a signal to the controller to increase the supply pressure to the feed pump; and (6) repeating said steps (3) through (5) at the increased supply pressure until a predetermined maximum supply pressure is reached.

19. The method of claim 18 wherein the air flow sensor includes a housing with the piston being slidably disposed in the housing, a magnet disposed on the piston for movement therewith, and a magnetic sensor mounted exteriorly of the housing, said step (2) including adjusting the position of the magnetic sensor relative to an intermediate position of the piston defined between the open and closed positions which causes a decrease in air flow volume through the air flow sensor based upon the capacity of the feed pump.

20. The method of claim 18 wherein the controller includes a timer, said step (5) including sensing the position of the piston as same approaches the closed position, and before the piston fully closes transmitting a signal to activate the timer such that if the piston does not return to the open position within a predetermined time period, the controller increases the supply pressure to the feed pump.

21. A method for filling a filter press having a feed pump for supplying slurry material under pressure to a plurality of filter plates, a pressure regulator associated with an air supply line connected to the feed pump, a controller for operating the pressure regulator, and an exhaust line connected to the feed pump, said method comprising the steps of:

(1) providing an air flow sensor in the exhaust line, the air flow sensor having a piston including a flow passage therethrough, said piston being movable between open and closed positions and being normally biased into said closed position;

(2) adjusting the air flow sensor to sense a closing movement of the piston and thus a decrease in air flow volume through the air flow sensor proportional to the feed pump capacity;

(3) supplying pressurized air to the feed pump through the air supply line and feeding slurry into the filter press;

(4) supplying a pressurized air pulse generated by the feed pump to the exhaust line to move the piston of the air flow sensor into the open position, and thereafter returning said piston to said closed position;

(5) repeating said steps (3) and (4) until the piston remains in the closed position for a period of time greater than a predetermined time period and thereafter transmitting a signal to the controller to increase the supply pressure to the feed pump.

22. The method of claim 21 wherein the feed pump is a double diaphragm feed pump having two pump chambers and includes valve means for controlling the flow of pressurized air from the air supply line into each of the pump chambers, said step (4) including pressurizing one of said two pump chambers and exhausting the other pump chamber to provide a pressurized air pulse in the exhaust line to move the piston of the air flow sensor into the open position.

* * * * *